UNITED STATES PATENT OFFICE.

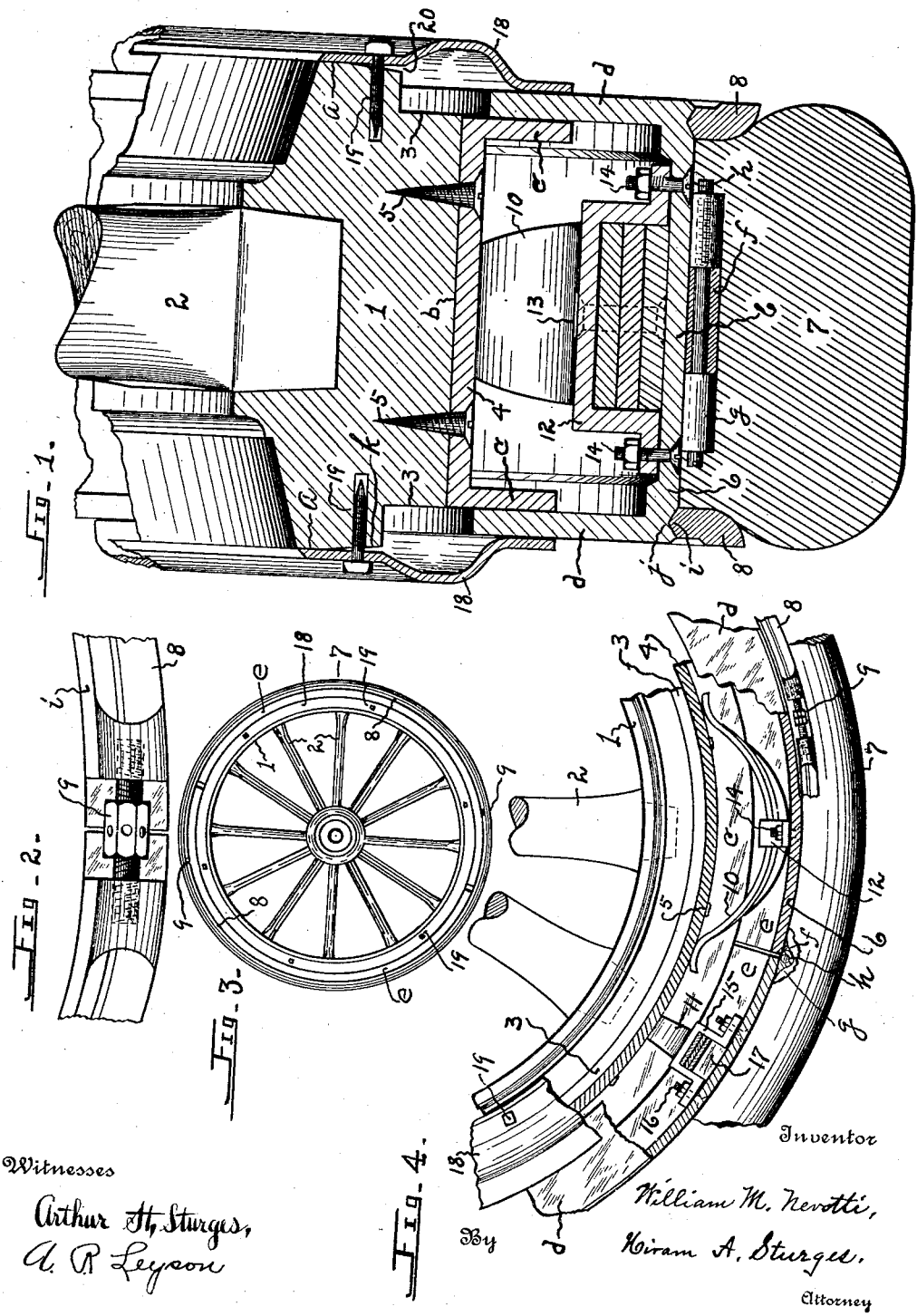

WILLIAM M. NEVOTTI, OF OMAHA, NEBRASKA.

RESILIENT VEHICLE-TIRE.

1,111,171.  Specification of Letters Patent.  Patented Sept. 22, 1914.

Application filed May 1, 1913. Serial No. 764,807.

*To all whom it may concern:*

Be it known that I, WILLIAM M. NEVOTTI, a citizen of the United States, residing at Omaha, in the county of Douglas and State of Nebraska, have invented certain new and useful Improvements in Resilient Vehicle-Tires, of which the following is a specification.

This invention relates to improvements in resilient vehicle tires, and has for its principal object to provide a tire which will consist of few parts so that it will be durable in wear and may be economically constructed, and having its parts so arranged that they may be conveniently assembled.

Other objects of the invention will be mentioned in detail.

The invention consists of the novel construction, combination and arrangement of parts as described herein and claimed, and as illustrated in the drawing, wherein,—

Figure 1 is a view of the tire in transverse section, a part of a wheel-spoke being added. Fig. 2 is an enlarged, broken view showing two connected parts of a compression-rim. Fig. 3 is a side view, on a reduced scale, of a vehicle wheel showing the segments of a bearing-rim. Fig. 4 is a view, partly in section and broken away, showing a part of the vehicle tire.

Referring now to the drawing for a more particular description, numerals 1 and 2 respectively, indicate the felly and spokes of a vehicle wheel. The felly may be constructed of any suitable material but, preferably, wood is employed, and its sides *a* are formed with annular recesses 3 opening upon its tread or outer face *b*.

At 4 is indicated a circular band or binding-rim for the felly, said band being provided with outwardly-projecting, parallel flanges or guides *c*. It has a width substantially equal to the width of the curved face *b* of the felly and may be secured thereto by suitable keepers or screws 5.

I provide the bearing-rim 6, which has inwardly-projecting, parallel flanges *d* adapted to loosely engage flanges *c* while disposed outwardly thereof and in alinement with recesses 3. It is formed of connected segments *e*, at least two segments being employed and preferably connected by means of hinge-members *f* and *g* and pintle *h* threaded therein.

A tread 7 of any suitable material, but preferably of rubber, is employed and mounted outwardly upon rim 6, and it may be secured thereon by means of compression-rims 8 engaging its sides, each of said rims 8 being formed on its inner side with a longitudinal ridge *i* adapted to engage within a groove *j*, said grooves *j* being formed in the periphery of the bearing-rim 6; and in order that rims 8 may be mounted in grooves *j*, they are formed as segments, and the ends of the segments are connected by turnbuckles 9.

The resiliency of the tire depends in part upon the longitudinal and transverse springs indicated respectively at 10 and 11 secured upon rim 6 and adapted to bear upon band 4. While other forms may be used, the leaf-springs shown are preferred. Springs 10 are disposed longitudinally of the tire and may be secured to rim 6 by use of brackets or staples 12, a bolt 13 being used for securing the springs to staples 12, and the staples may be secured to rim 6 by bolts 14.

Springs 11 are disposed transversely of the tire, and may be secured to rim 6 by use of brackets or staples 15. Bolts 16 may be employed for securing the staples to rim 6, and a block 17 is preferably used in connection with each of staples 16 and interposed between spring 11 and rim 6, since these springs have a less length than springs 10.

To assemble the parts, band 4 is first secured upon the felly, and after the springs 10 and 11 have been mounted upon the segments of rim 6, the segments are connected by use of the threaded pins *h*. The tire 7 is then mounted upon rim 6 and is secured by rims 8. Any desired number of springs 10 and 11 may be employed, and they operate to provide elasticity tending to prevent vibration when the vehicle wheel is in use.

In the arrangement of the springs, a spring 11 is interposed between each of springs 10, and since springs 11 are disposed transversely of the wheel, they tend to resist the stresses directed transversely of tire 7 which often occurs when the wheel is passing over obstructions.

On account of the provision of recesses 3, flanges *d* may slide inwardly of band 4 when the springs are compressed, this compression being occasioned when the vehicle wheel passes over obstructions or a heavy weight is sustained by the tire; and in order that this recess may be covered to prevent dust from accumulating therein, the flexible rims or annular dust-guards 18 are provided. Each dust-guard may be secured to the felly by screw-bolts 19, and is so disposed that its outer part may engage one of flanges $d$ of rim 6. It is not desirable, however, that any considerable degree of friction will be occasioned by a contact of members 18 with flanges $d$, and in order that a suitable adjustment of these parts may be made, the sides of the felly are formed with inclined facets $k$ so that recesses 20 may be formed between rims 18 and the felly; and these rims, by use of screw-bolts 19, may therefore be held in contact with flanges $d$ at any suitable degree of pressure, or may be maintained immediately adjacent to said flanges, as may be desired.

It will be noted that one of the functions to be discharged by rims 8 is to prevent lateral movements of the tread 7 from its seat, another function being to reinforce the segmental bearing-rim. By means of the turnbuckles, rims 8 may be pressed against rims 6, the ridges $i$ being seated within grooves $j$.

On account of the formation of annular recesses 3, the felly may have a greater width than could be otherwise provided; and the sides of the felly, which project outwardly or transversely of the recesses, provide supports upon which the dust-guards may be mounted. It will be seen that the dust-guards prevent obstructions from becoming lodged in the recesses, and this is of importance since the springs 10 and 11 would not be operative unless flanges $d$ may enter said recesses.

While only two segments are shown for the compression-rim and bearing rim, a greater number of segments may be employed if desired for each of these members.

While I have shown and described leaf-springs disposed in alternation longitudinally and transversely of the tire, and prefer this construction, I do not wish to limit myself in this respect any further than the scope of the appended claim, and I may employ springs of any suitable form or arrangement interposed between band 4 and rim 6.

Among some of the advantages to be derived by use of the construction as described, it may be stated that the parts are few and may be conveniently manufactured, and they may be conveniently assembled. If it is desired to separate the parts for the purpose of cleaning them, or if one of the springs becomes broken and it is desired to replace the same with a new one, the parts may be conveniently separated by removing one of the threaded pins $h$, after the dust-guards and compression-rims and tread 7 have been removed.

Having fully described my invention what I claim and desire to secure by Letters Patent is,—

A tire of the class described, comprising, in combination with a felly provided with annular recesses in its sides opening on its periphery and having facets on its sides inclined inwardly toward said recesses; a binding-rim upon the felly provided with outwardly-projecting flanges; a bearing-rim having inwardly-projecting flanges for engagement with the flanges of the binding-rim; a tire carried by the bearing-rim; springs disposed between the binding-rim and said bearing-rim; dust-guards formed as flexible, annular rims disposed outwardly of said annular recesses and forming convergent recesses adjacent to the facets of the felly; and a plurality of keepers traversing the dust-guards and convergent recesses for longitudinally adjustable mountings in the felly, to move the dust-guards inwardly on said convergent recesses.

In testimony whereof I have affixed my signature in presence of two witnesses.

WILLIAM M. NEVOTTI.

Witnesses:
HIRAM A. STURGES,
ARTHUR H. STURGES.

Copies of this patent may be obtained for five cents each, by addressing the "Commissioner of Patents, Washington, D. C."